US010673810B2

(12) United States Patent
Hashimoto et al.

(10) Patent No.: US 10,673,810 B2
(45) Date of Patent: Jun. 2, 2020

(54) MOBILE TERMINAL THAT ACQUIRES ADDRESS INFORMATION OF AN INTENDED IMAGE FORMING APPARATUS FOR PRINTING A PRINT JOB

(71) Applicants: Yuuta Hashimoto, Tokyo (JP); Tomoyuki Takahira, Kanagawa (JP)

(72) Inventors: Yuuta Hashimoto, Tokyo (JP); Tomoyuki Takahira, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 478 days.

(21) Appl. No.: 14/740,183

(22) Filed: Jun. 15, 2015

(65) Prior Publication Data
US 2015/0372971 A1 Dec. 24, 2015

(30) Foreign Application Priority Data

Jun. 19, 2014 (JP) .................................. 2014-126155
May 11, 2015 (JP) .................................. 2015-096528

(51) Int. Cl.
H04L 29/12 (2006.01)
H04W 4/80 (2018.01)
(52) U.S. Cl.
CPC ...... H04L 61/2076 (2013.01); H04L 61/2007 (2013.01); H04W 4/80 (2018.02)
(58) Field of Classification Search
CPC ....... H04N 2201/0094; H04N 1/00278; H04N 2201/006; H04N 2201/3205; H04N 1/00474; G06F 3/1292
See application file for complete search history.

(56) References Cited

U.S. PATENT DOCUMENTS 8,335,489 B2 12/2012 Hamada
2005/0125669 A1* 6/2005 Stewart ............... H04L 63/0492
713/171

(Continued)

FOREIGN PATENT DOCUMENTS

EP 2725481 A2 4/2014
JP 2004364190 A 12/2004

(Continued)

OTHER PUBLICATIONS

European Patent Office Communication, extended European search report, dated Sep. 15, 2015.

(Continued)

Primary Examiner — Tauqir Hussain
(74) Attorney, Agent, or Firm — Duft & Bornsen, PC

(57) ABSTRACT

An information processing apparatus connected with one or more apparatuses through a network, comprises: a first acquiring unit configured to acquire first address information for indicating one of addresses in the network among addresses of the apparatuses and first apparatus specific information for identifying the apparatuses; a second acquiring unit configured to acquire second apparatus specific information for identifying an apparatus indicated by the first address information acquired by the first acquiring unit; a determining unit configured to determine whether the first apparatus specific information acquired by the first acquiring unit is the same as the second apparatus specific information acquired by the second acquiring unit or not; and a process requesting unit configured to request the apparatus indicated by the first address information to perform a certain process upon the determining unit determining the first apparatus specific information to be the same as the second apparatus specific information.

10 Claims, 13 Drawing Sheets

(56) References Cited

U.S. PATENT DOCUMENTS

| | | | |
|---|---|---|---|
| 2005/0204022 A1 | 9/2005 | Johnston et al. | |
| 2008/0117847 A1* | 5/2008 | Hamada | H04W 28/18 370/310 |
| 2010/0061294 A1* | 3/2010 | Proctor, Jr. | G06Q 30/0623 370/328 |
| 2014/0068719 A1* | 3/2014 | Kiukkonen | H04W 12/08 726/4 |
| 2014/0086398 A1* | 3/2014 | Tabushi | H04N 1/0022 379/100.08 |
| 2014/0092413 A1* | 4/2014 | Shibata | H04N 1/00204 358/1.13 |
| 2014/0101433 A1 | 4/2014 | Tanaka | |
| 2014/0118769 A1* | 5/2014 | Adachi | G06F 3/1211 358/1.13 |
| 2014/0185082 A1 | 7/2014 | Yamada | |
| 2014/0355047 A1* | 12/2014 | Lee | G06F 3/1292 358/1.15 |
| 2014/0355048 A1* | 12/2014 | Kang | G06F 3/1292 358/1.15 |
| 2015/0035650 A1* | 2/2015 | Lind | H04B 5/0056 340/10.1 |
| 2015/0038086 A1* | 2/2015 | Kim | H04W 4/008 455/41.3 |
| 2015/0060547 A1 | 3/2015 | Nagasawa | |
| 2015/0098096 A1 | 4/2015 | Hashimoto | |
| 2015/0153975 A1 | 6/2015 | Mori | |

FOREIGN PATENT DOCUMENTS

| | | |
|---|---|---|
| JP | 4042322 | 2/2008 |
| JP | 5121212 | 1/2013 |
| JP | 2013107243 A | 6/2013 |
| JP | 2014-007614 | 1/2014 |
| JP | 2014032661 | 2/2014 |
| JP | 2014-094553 | 5/2014 |
| JP | 2014095969 A | 5/2014 |
| JP | 2015050513 A | 3/2015 |

OTHER PUBLICATIONS

European Patent Office Communication, extended European search report, dated Sep. 24, 2015.

Japanese Notice of rejection; Application 2015-096528; dated Feb. 29, 2019.

Notice of rejection of Japanese patent Application JP2015096528, dated Sep. 24, 2019.

Notice of rejection of Japanese patent Application JP2016096528, dated Sep. 24, 2019.

* cited by examiner

FIG.13

|  | OPERATION PANEL | MAIN PART |
|---|---|---|
| Power Supply State | Power On | Standby |
| | | Engine Off |
| | | STR |
| | Power Off | Standby |
| | | Engine Off |
| | | STR |

MOBILE TERMINAL THAT ACQUIRES ADDRESS INFORMATION OF AN INTENDED IMAGE FORMING APPARATUS FOR PRINTING A PRINT JOB

CROSS-REFERENCE TO RELATED APPLICATIONS

The present application is based on Japanese Priority Application No. 2014-126155 filed on Jun. 19, 2014, and Japanese Priority Application No. 2015-096528 filed on May 11, 2015, the entire contents of which are hereby incorporated herein by reference.

BACKGROUND OF THE INVENTION

1. Field of the Invention

Present technology relates to an information processing apparatus, an information processing method and a recording medium.

2. Description of the Related Art

Technology for acquiring parameters for performing wireless communications from a NFC (Near Field Communication) chip is known (for example, Japanese Patent Gazette No. 5121212). Also, technology for acquiring parameters such as an IP address necessary for communicating with an image forming apparatus such as a MFP (Multifunction Peripheral) from the NFC chip is known as an application of above mentioned technology, in a case where functions of the MFP, such as printing or scanning, are used by a mobile terminal.

However, there is a problem to be solved in the aforementioned technology, for example, in a case where the IP address of the image forming apparatus is dynamically allocated by using DHCP (Dynamic Host Configuration Protocol). In such case, the IP address acquired from the NFC chip may be different from the IP address being allocated to the image forming apparatus whose functions such as printing or scanning are expected to be used. Therefore another image forming apparatus may perform such functions.

RELATED ART DOCUMENT

Patent Document

[Patent Document 1]: Japanese Patent Gazette No. 5121212

SUMMARY OF THE INVENTION

An object of disclosure of the present technology is to prevent requesting an unintended apparatus to perform process.

The following configuration is adopted to achieve the aforementioned object.

In one aspect of the embodiment, there is provided a non-transitory computer-readable recording medium having stored therein a program for causing a computer to serve as an information processing apparatus connected with one or more apparatuses through a network, the information processing apparatus comprising: a first acquiring unit configured to acquire first address information for indicating one of addresses in the network among addresses of the apparatuses and first apparatus specific information for identifying one of the apparatuses; a second acquiring unit configured to acquire second apparatus specific information for identifying an apparatus indicated by the first address information acquired by the first acquiring unit; a determining unit configured to determine whether the first apparatus specific information acquired by the first acquiring unit is the same as the second apparatus specific information acquired by the second acquiring unit or not; and a process requesting unit configured to request the apparatus indicated by the first address information to perform a certain process upon the determining unit determining the first apparatus specific information to be the same as the second apparatus specific information.

Other objects, features and advantages of the present invention will become more apparent from the following detailed description when read in conjunction with the accompanying drawings.

BRIEF DESCRIPTION OF THE DRAWINGS

FIG. 13 is diagram for illustrating an example of power supply states of an operation panel and a main part.

DETAILED DESCRIPTION OF THE PREFERRED EMBODIMENTS

Herein below, embodiments will be described with reference to the accompanying drawings.

First Embodiment

System Configuration

Figure 1:
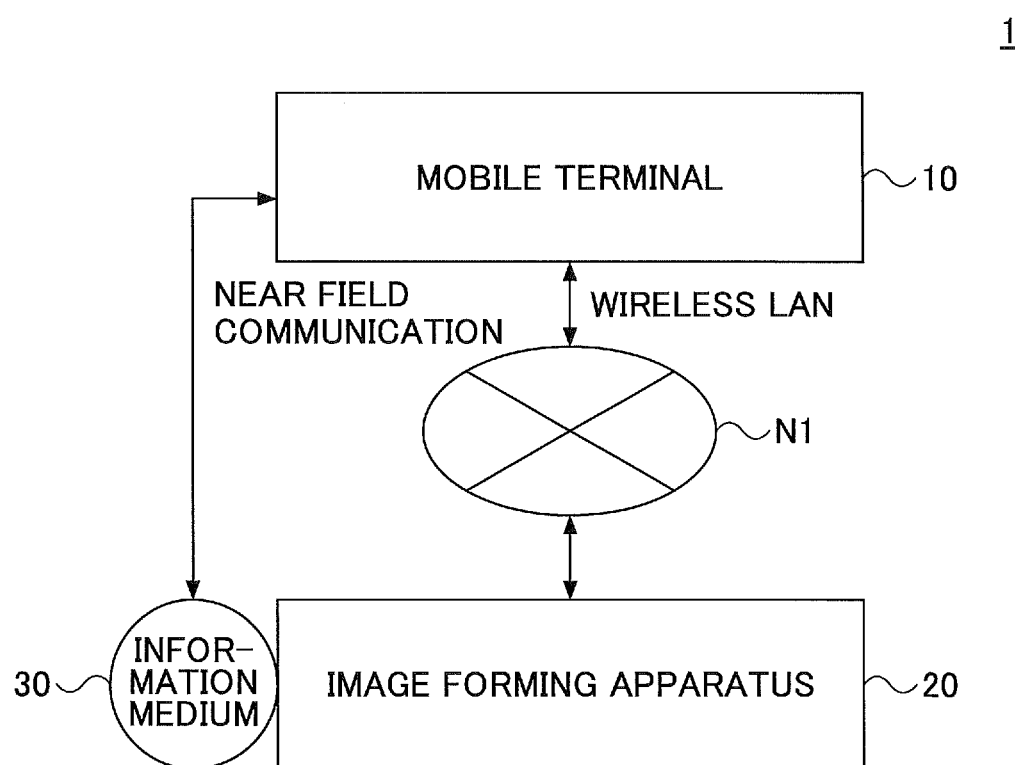
FIG. 1 is a diagram for illustrating an example of a printing system of a first embodiment.

First, a printing system 1 of the present embodiment will be described. FIG. 1 is a diagram for illustrating an example of a printing system of the first embodiment. In the printing system 1 shown in FIG. 1, a mobile terminal 10 and one or more image forming apparatuses 20 are connected to a network N1 by wired or wireless connection. The mobile terminal 10 is connected to the network N1 by wireless connection. An information medium 30 is attached to a housing of the image forming apparatus 20. The mobile terminal 10 and the information medium 30 are in communication with each other through Near Field Communication.

The mobile terminal 10 is a terminal device, such as a smartphone, operated by a user. The mobile terminal 10 may be a mobile phone, a tablet terminal, a portable game machine, a PDA or a digital camera. An application program (printing application) for outputting an instruction to print printing data is installed in the mobile terminal 10. The mobile terminal 10 creates a printing job including the printing data of the instruction to print, and sends it to the image forming apparatus 20.

Also, the mobile terminal 10 includes a Near Field Communication device such as a NFC chip (described below). The mobile terminal 10 acquires the IP address of the image forming apparatus 20 when the user holds the mobile terminal 10 over the information medium 30 attached at a certain position on the housing of the image forming apparatus 20. The mobile terminal 10 sends the printing job to the acquired IP address so that the image forming apparatus 20 indicated by the IP address performs the printing job, thereby printing the printing data.

Additionally, the printing application means an application program capable of outputting instructions to print the printing data, such as a browser, document creating software, or an image viewer.

The image forming apparatus 20 is an image processing apparatus, such as a printer, for printing the printing data by receiving the printing job from the mobile terminal 10. Additionally, the image forming apparatus 20 may be a MFP (multifunction peripheral) which includes a copier function, a scanner function, a fax function, etc., as well as the printer function.

Also, for example, the image forming apparatus 20 may be an image output apparatus such as a projector, an electronic whiteboard, or digital signage, or may be a sound output apparatus such as a speaker. Therefore, although in the present embodiment, the printing system is described as an example of an information processing system, this is not a limiting example. For example, the present technology can be applied to an image output system in which an image output apparatus is included instead of the image forming apparatus 20, or a sound output system in which a speaker is included instead of the image forming apparatus 20. In other words, the present technology can be applied to various systems in which a mobile terminal 10 for creating a certain job and an apparatus for performing the job received from the mobile terminal 10 are respectively included.

The information medium 30 is a Near Field Communication device, such as a NFC chip, attached at a certain position on the housing of the image forming apparatus 20. That is, the information medium 30 is an electronic tag seal having the NFC function (NFC tag) or the like. The information medium 30 stores information such as the IP address of the image forming apparatus 20 or apparatus specific information for identifying the image forming apparatus 20 to which the information medium 30 is attached. The mobile terminal 10 can acquire such information stored in the information medium 30 through Near Field Communication. That is, since the information medium 30 storing the IP address and the apparatus specific information is attached to the image forming apparatus 20, the mobile terminal 10 can acquire such information from the information medium 30 through Near Field Communication. And as described above, the mobile terminal 10 sends the printing job to the image forming apparatus 20 indicated by the IP address acquired from the information medium 30, thereby enabling performing the printing job by the image forming apparatus 20.

Additionally, for example, the printing system 1 may include a printing server for accumulating the printing jobs sent from the mobile terminal 10. Also, the printing system 1 may include an arbitrary number of the mobile terminals 10.

<Hardware Configuration>
<Mobile Terminal>

Figure 2:
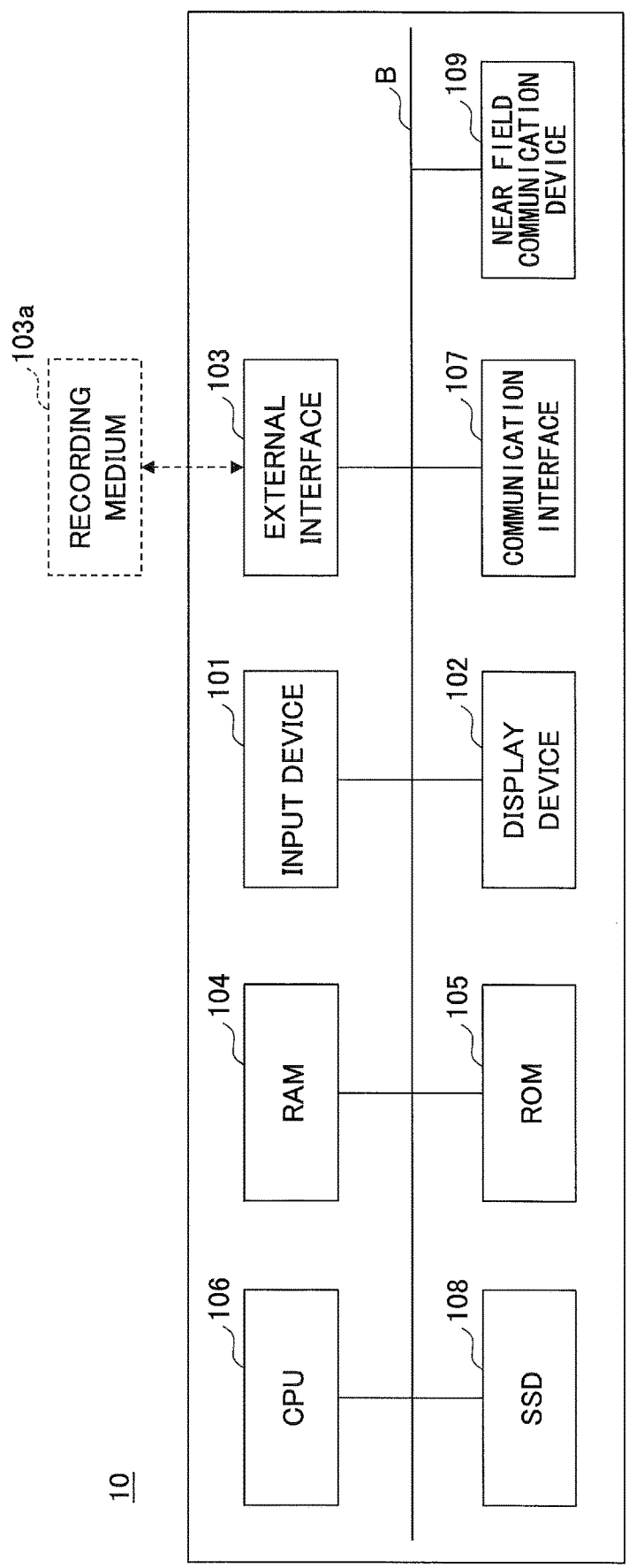
FIG. 2 is a block diagram for illustrating an example of a hardware configuration of a mobile terminal.

For example, the mobile terminal 10 of the present embodiment has a hardware configuration shown in FIG. 2. FIG. 2 is a block diagram for illustrating an example of the hardware configuration of the mobile terminal of the present embodiment. The mobile terminal 10 shown in FIG. 2 includes an input device 101, a display device 102, an external interface 103, a RAM (Random Access Memory) 104, a ROM (Read Only Memory) 105, a CPU (Central Processing Unit) 106, a communication interface 107, an SSD (Solid State Drive) 108, a Near Field Communication device 109, etc., which are connected with each other through a bus B.

For example, the input device 101 is formed of a touch panel and is used for inputting operation signals in the mobile terminal 10. Additionally, the input device 101 may be a keyboard or a mouse. For example, the display device 102 is formed of a LCD (Liquid Crystal Display) and displays process results of the mobile terminal 10.

The external interface 103 is an interface to an external device. A recording medium 103a is exemplified as the external device. Programs for achieving the operations of the present embodiment may be stored in the recording medium 103a. The mobile terminal 10 reads or writes data in the recording medium 103a through the external interface 103.

For example, the recording medium 103a may be a SD Memory card or the like. The recording medium 103a may be a USB memory (Universal Serial Bus memory), a DVD (Digital Versatile Disk), a CD (Compact Disk), or a flexible disk.

The RAM 104 is a volatile semiconductor memory (storage device) for storing programs or data temporarily. The ROM 105 is non-volatile semiconductor memory (storage device) for storing programs and data even after being powered off. Programs and data are stored in the ROM 105, such as BIOS (Basic Input/Output System) to be used when activating the mobile terminal 10, OS settings and network settings.

The CPU 106 is a calculation device for executing processes by retrieving programs and data from the storage device such as the ROM 105 or the SSD 108 to load them into the RAM 104 and to process them, thereby achieving control and functions of the entire mobile terminal 10.

The communication interface 107 is an interface for connecting the mobile terminal 10 to a mobile network or the Internet. Thus, the mobile terminal 10 can perform data communications through the communication interface 107.

The SSD 108 is a non-volatile storage device for storing programs and data. For example, the programs such as an OS (Operating System) that is basic software for controlling the entire mobile terminal 10, and application software for providing functions on the OS are stored in the SSD 108. The SSD 108 manages the programs and data by using a certain file system or DB (data base). Additionally, the mobile terminal 10 may further include a HDD (Hard Disk Drive) or may include the HDD instead of the SSD 108.

For example, the Near Field Communication device 109 is formed of a NFC chip. Thus, the mobile terminal 10 can perform data communication through the Near Field Communication device 109.

The mobile terminal 10 of the present embodiment having the aforementioned hardware configuration can perform processes described below.

<Image Forming Apparatus and Information Medium>

Figure 3:
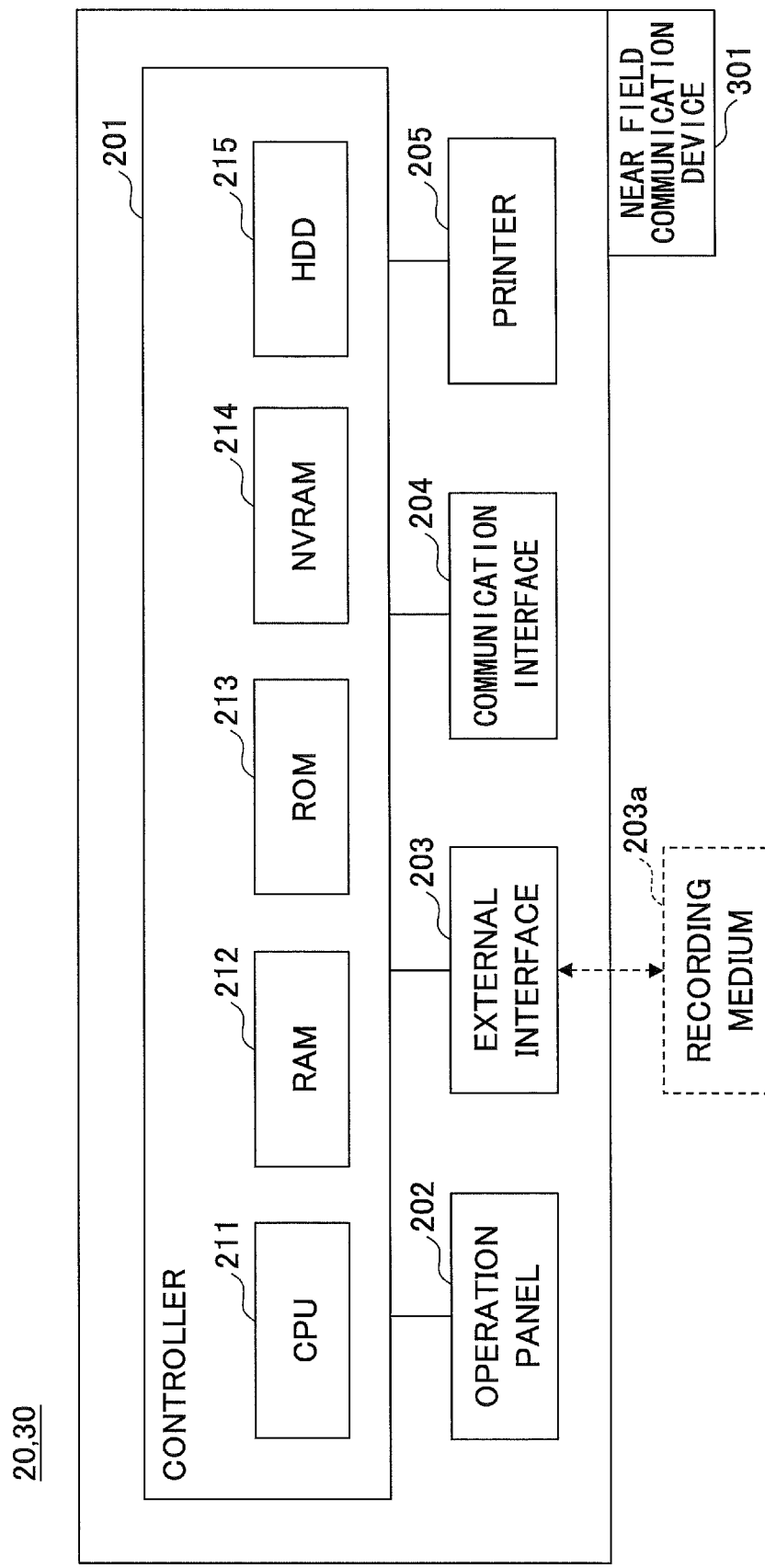
FIG. 3 is a block diagram for illustrating a hardware configuration of an image forming apparatus and an information medium of the first embodiment.

For example, the image forming apparatus 20 and the information medium 30 of the present embodiment have a hardware configuration shown in FIG. 3. FIG. 3 is a block diagram for illustrating the hardware configuration of the image forming apparatus and the information medium of the first embodiment. The image forming apparatus 20 shown in FIG. 3 includes a controller 201, an operation panel 202, an external interface 203, a communication interface 204, a printer 205, and the like. Also, a Near Field Communication device 301 is attached to outside (housing) of the image forming apparatus 20 so as to form the information medium 30.

The controller 201 includes a CPU 211, a RAM 212, a ROM 213, a NVRAM 214 and a HDD 215. The ROM 213 stores programs and data. The RAM 212 stores programs and data temporarily. The NVRAM 214 stores, for example, setting information or the like. The HDD 215 stores programs and data.

The CPU 211 retrieves programs, data, and setting information from the ROM 213, the NVRAM 214, or the HDD 215 to load them into the RAM 212 and to process them, thereby achieving control and functions of the entire image forming apparatus 20.

The operation panel 202 includes an input unit for accepting operational input from the user and a display unit for displaying. The external interface 203 is an interface to an external device. A recording medium 203a is exemplified as the external device. The image forming apparatus 20 reads or writes data in the recording medium 203a through the external interface 203. For example, the recording medium 203a may be a flexible disk, a CD, a DVD, a SD Memory card, a USB memory or the like.

The communication interface 204 is an interface for connecting the image forming apparatus 20 to the network N1. Thus, the image forming apparatus 20 performs data communication through the communication interface 204. The printer 205 is a printing device (image processing engine) for printing the printing data to output it.

For example, the Near Field Communication device 301 is a NFC chip, or the like. The information medium 30 performs data communication with the mobile terminal 10 through the Near Field Communication device 301. For example, a NFC chip is attached at a certain position of the housing of the image forming apparatus 20, thereby forming the Near Field Communication device 301 outside the image forming apparatus 20. In this case, preferably, the NFC chip is attached at a position suitable for easily performing Near Field Communication with the mobile terminal 10.

Additionally, the Near Field Communication device 301 may not be disposed outside the image forming apparatus 20 but inside the image forming apparatus 20 as long as Near Field Communication with the mobile terminal 10 can be performed.

The image forming apparatus 20 and the information medium 30 of the present embodiment, having such hardware configuration, can perform processes described below.

<Software Configuration>

Figure 4:
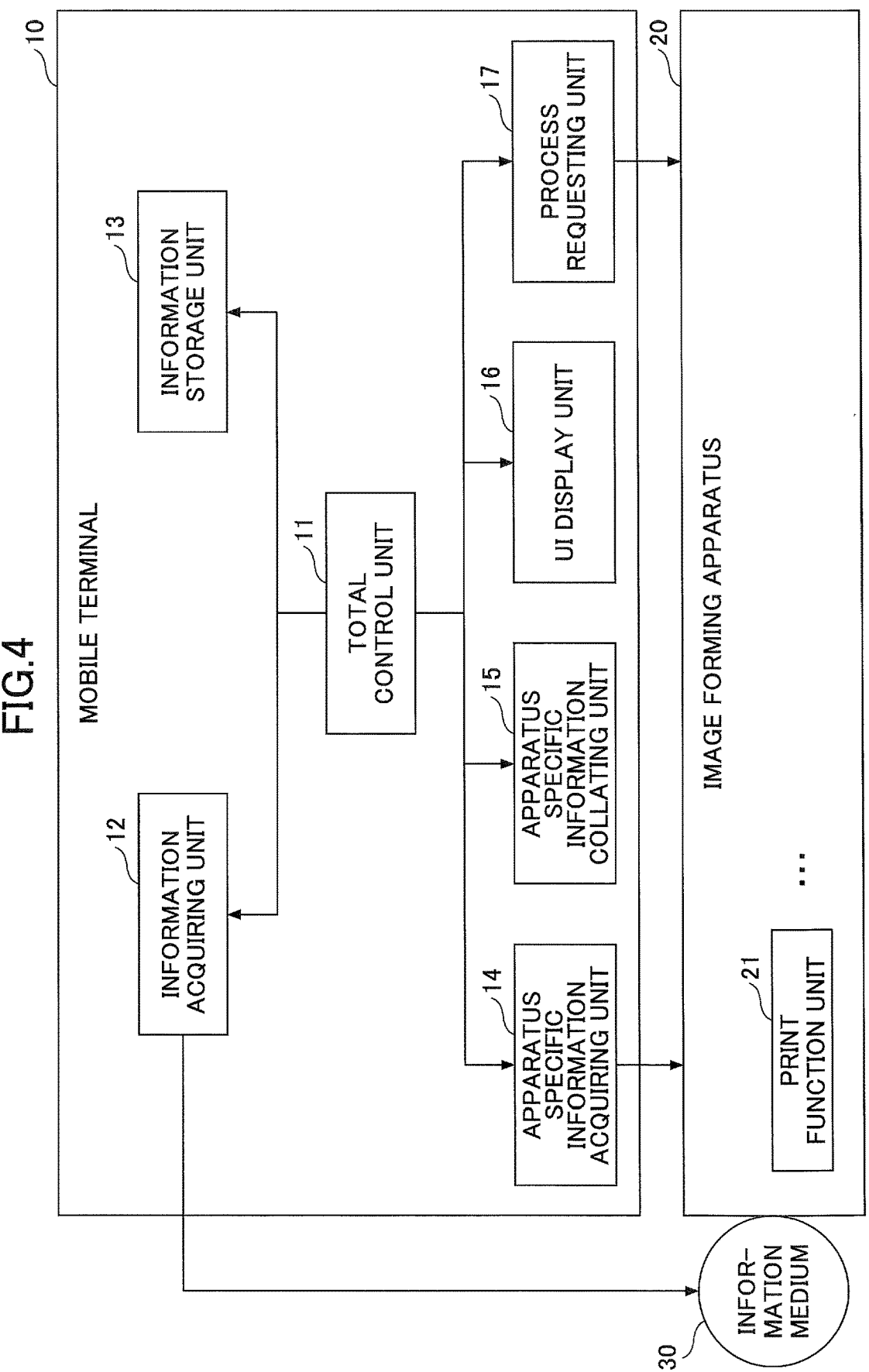
FIG. 4 is a block diagram for illustrating an example of a printing system of the first embodiment.

For example, the printing system 1 of the present embodiment includes function units as shown in FIG. 4. FIG. 4 is a block diagram for illustrating an example of the functional configuration of the printing system of the first embodiment.

The mobile terminal 10 of the printing system 1 includes a total control unit 11, an information acquiring unit 12, an information storage unit 13, an apparatus specific information acquiring unit 14, an apparatus specific information collating unit 15, an UI display unit 16, a process requesting unit 17, and the like. Also, the image forming apparatus 20 of the printing system 1 includes a print function unit 21 and the like.

The total control unit 11 is achieved by processes performed by the CPU 106 and the like, and, for example, requests other units to perform processes in response to the user's operation through the input device 101 or requests from the other units.

The information acquiring unit 12 is achieved by processes performed by the CPU 106 and the Near Field Communication device 109 and the like, and acquires information such as IP address or apparatus specific information from the information medium 30 through Near Field Communication. Additionally, hereinafter, the apparatus specific information acquired by the apparatus specific information acquiring unit 12 from the information medium 30 is referred to as "first apparatus specific information" so as to distinguish it from the apparatus specific information acquired by the apparatus specific information acquiring unit 14 (described below). Also, the IP address acquired by the information acquiring unit 12 is an example of first address information.

As described above, the apparatus specific information means information for identifying the image forming apparatus 20. For example, the apparatus specific information is formed of a manufacture number (serial number) of the image forming apparatus 20, a MAC (Media Access Control) address of the image forming apparatus 20, or a combination thereof. Also, for example, the apparatus specific information may be a value (hash value) calculated by inputting the manufacture number (serial number), the MAC address, or the combination thereof to a hash function having a certain algorithm.

The information storage unit 13 is achieved by functions of the ROM 105, the SSD 108, and the like, and stores the first apparatus specific information acquired by the information acquiring unit 12 and the apparatus specific information acquired by the apparatus specific information acquiring unit 14.

The apparatus specific information acquiring unit 14 is achieved by processes performed by the CPU 106, the communication interface 105 and the like, and acquires apparatus specific information, based on the IP address acquired by the information acquiring unit 12 from the information medium 30, of the image forming apparatus 20 indicated by the IP address. Additionally, hereinafter, the apparatus specific information acquired by the apparatus specific information acquiring unit 14 is referred to as "second apparatus specific information" so as to distinguish it from the first apparatus specific information.

The apparatus specific information collating unit 15 is achieved by processes performed by the CPU 106 and the like, and determines whether the first apparatus specific information stored in the information storage unit 13 is the same as the second apparatus specific information acquired by the apparatus specific information acquiring unit 14.

The UI display unit 16 is achieved by processes performed by the CPU 106, the display device 102 and the like, and generates a UI (User Interface) to display it.

The process requesting unit 17 is achieved by processes performed by the CPU 106 and the like, and requests the image forming apparatus 20 to perform the printing job.

The print function unit 21 is achieved by functions of the printer 205 and the like, and prints the printing data included in the printing job requested to be performed by the process requesting unit 17 of the mobile terminal 10. Additionally, the image forming apparatus 20 includes a scanner function unit for generating image data of a scanned document, a copier function unit for copying the scanned document, a fax function unit for transmitting the scanned document or electronic data by fax through a telephone line, etc., as well as the printer function unit 21.

The information medium 30 is achieved by functions of the Near Field Communication device 301, and stores information such as the IP address or the apparatus specific information of the image forming apparatus 20 to which the information medium 30 is attached. Also, in response to request from the information acquiring unit 12 of the mobile terminal 10, the information medium 30 sends the stored IP address or the stored apparatus specific information to the mobile terminal 10 through Near Field Communication.

<Detail of Process>

Figure 5:
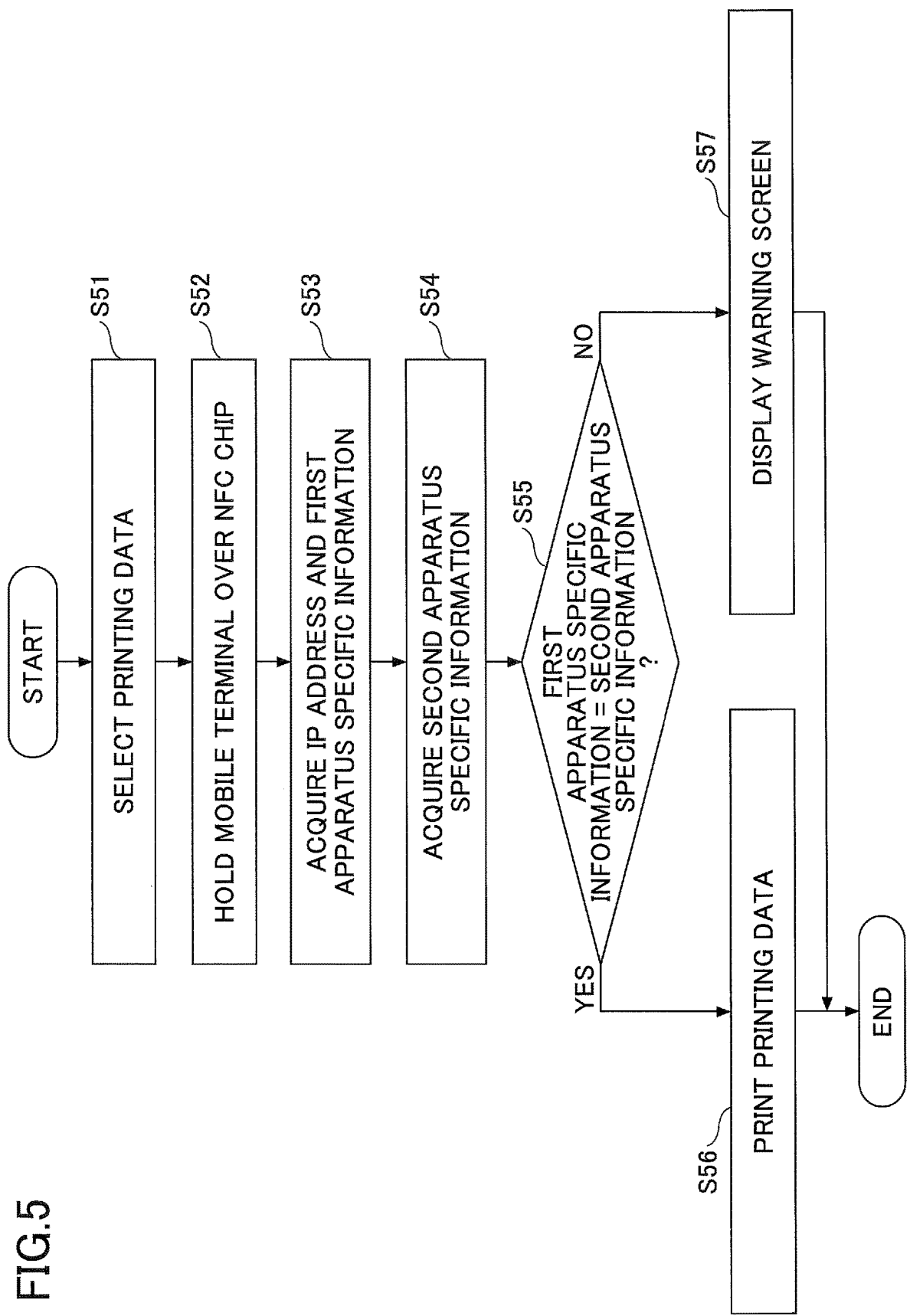
FIG. 5 is a flowchart for illustrating a printing process of the first embodiment.

In the following, a detailed description of the process performed by the printing system 1 of the first embodiment will be given. First, the printing process of the printing system 1 of the first embodiment will be described. FIG. 5 is a flowchart for illustrating the printing process of the first embodiment.

In step S51, the user selects the printing data to instruct printing it using the printing application installed in the mobile terminal 10. Then, a screen is displayed by the display device 102 of the mobile terminal 10, for prompting the user to hold the mobile terminal 10 over the image forming apparatus 20 expected to print the printing data.

In step S52, the user holds the mobile terminal 10 over the NFC chip (information medium 30) attached to the desired image forming apparatus 20.

In step S53, the information acquiring unit 12 of the mobile terminal 10 acquires the IP address and the apparatus specific information (first apparatus specific information) from the information medium 30.

In step S54, the apparatus specific information acquiring unit 14 of the mobile terminal 10 acquires, based on the IP address acquired from the information medium 30, the second apparatus specific information from the image forming apparatus 20 indicated by the IP address.

In step S55, the apparatus specific information collating unit 15 of the mobile terminal 10 determines whether the first apparatus specific information acquired from the information medium 30 is the same as the second apparatus specific information acquired based on the IP address acquired from the information medium 30. In a case where the first apparatus specific information is the same as the second apparatus specific information (step S55 YES), process of step S56 will be performed. Meanwhile, in a case where the first apparatus specific information is different from the second apparatus specific information (step S55 NO), the process of step S57 will be performed.

In other words, if the IP address of the image forming apparatus 20; to which the NFC chip (information medium 30) is attached and, over which the mobile terminal 10 is held by the user in step S52 has been changed, the process of step S57 will be performed; while the process of step S56 will be performed if the IP address has not been changed.

In step S56, the process requesting unit 17 of the mobile terminal 10 sends the printing job to the image forming apparatus 20 indicated by the IP address acquired from the information medium 30 in a case where the first apparatus specific information is the same as the second apparatus specific information. The print function unit 21 of the image forming apparatus 20, receiving the printing job from the mobile terminal 10, prints the printing data included in the printing job.

In step S57, the UI display unit 16 of the mobile terminal 10 displays on the display device 102 a warning screen indicating that the IP address has been changed in a case where the first apparatus specific information is not the same as the second apparatus specific information. Thus, for example, in a case where the IP address of the image forming apparatus 20 is allocated by using DHCP, the user can be aware of the change of the IP address of the desired image forming apparatus 20 (the IP address written in the information medium 30 is not used for the desired image forming apparatus 20 as of now). Therefore, sending the printing job to an unintended image forming apparatus 20 to print the printing data by the unintended image forming apparatus 20 is prevented.

Figure 6:
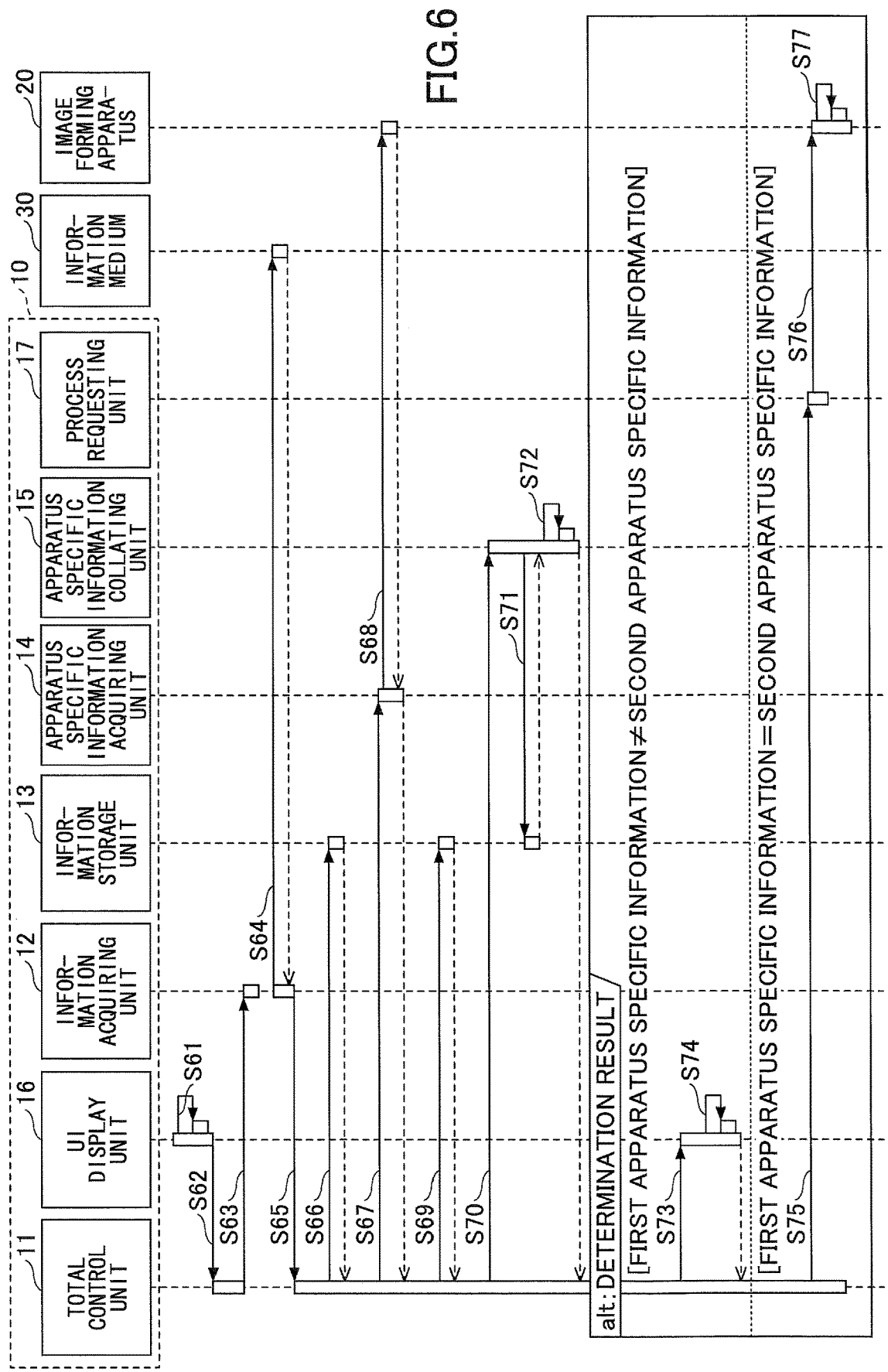
FIG. 6 is a sequence diagram for illustrating an example of a printing process of the first embodiment.

In the following, a detailed sequence of printing process performed by the printing system 1 of the first embodiment will be described. FIG. 6 is a sequence diagram for illustrating an example of printing process of the first embodiment.

In step S61, the user selects desired printing data by using the printing application installed in the mobile terminal 10 through the UI display unit 16 of the mobile terminal 10, thereby gives an instruction to print.

In step S62, the UI display unit 16 of the mobile terminal 10, accepting the instruction to print from the printing application, notifies the total control unit 11 of performance of the printing job. Also, for example, the UI display unit 16 of the mobile terminal 10 displays on the display device 102 a screen for prompting the user to hold the mobile terminal 10 over the information medium 30 (NFC chip) of the image forming apparatus 20 expected to print the printing data.

In step S63, the total control unit 11 of the mobile terminal 10 requests the information acquiring unit 12 to acquire the IP address, the first apparatus specific information, etc., through Near Field Communication. Thus, the mobile terminal 10 is ready to communicate with the information medium 30 by Near Field Communication, and the screen displayed in step S62 is maintained until the user holds the mobile terminal 10 over the information medium 30.

In step S64, the user holds the mobile terminal 10 over the NFC chip (information medium 30) which is attached to the image forming apparatus 20 expected to print. The information acquiring unit 12 of the mobile terminal 10 acquires the IP address and the first apparatus specific information from the information medium 30 through Near Field Communication. Additionally, for example, at this time, the information acquiring unit 12 may acquire information related to SSID (Service Set Identifier) or encryption schemes, a password for using the network, and a port number of HTTP (HyperText Transfer Protocol) or HTTPS (HTTP over SSL/TLS) for using functions provided by the image forming apparatus 20.

Although the description is given where the information acquiring unit 12 of the mobile terminal 10 acquires the IP address, the first apparatus specific information and the like from the information medium 30 through Near Field Communication, this is not a limiting example. For example, the user may acquire the IP address, the first apparatus specific information and the like from the information medium 30, by reading a QR code attached, as the information medium 30, outside the image forming apparatus 20 using a camera device (not shown) included in the mobile terminal 10.

In step S65, the information acquiring unit 12 of the mobile terminal 10 notifies the total control unit 11 of the acquisition of the IP address, the first apparatus specific information and the like from the information medium 30.

In step S66, the total control unit 11 of the mobile terminal 10 has the information storage unit 13 store the first apparatus specific information acquired by the information acquiring unit 12 in step S64.

In step S67, the total control unit 11 of the mobile terminal 10 requests the apparatus specific information acquiring unit 14 to acquire the second apparatus specific information.

In step S68, the apparatus specific information acquiring unit 14 of the mobile terminal 10 acquires, based on the IP address acquired by the information acquiring unit 12 in step S64, the apparatus specific information (second apparatus specific information) of the image forming apparatus 20 indicated by the IP address.

Additionally, in a case where the apparatus specific information is, for example, the manufacture number (serial number) or the MAC address of the image forming apparatus 20, the apparatus specific information can be acquired by using MIB (Management Information Base). Also, for example, the apparatus specific information can be acquired by using WebAPI provided by the image forming apparatus 20. Further, in a case where the apparatus specific information is the MAC address of the image forming apparatus 20, the apparatus specific information can be acquired by using ARP (Address Resolution Protocol).

In step S69, the total control unit 11 of the mobile terminal 10 has the information storage unit 13 store the second apparatus specific information acquired by the apparatus specific information acquiring unit 14 in step S68.

In step S70, the total control unit 11 of the mobile terminal 10 requests the apparatus specific information collating unit 15 to determine whether the first apparatus specific information is the same as the second apparatus specific information or not.

In step S71, the apparatus specific information collating unit 15 of the mobile terminal 10 retrieves the first apparatus specific information and the second apparatus specific information from the information storage unit 13.

In step S72, apparatus specific information collating unit 15 of the mobile terminal 10 determines whether the first apparatus specific information retrieved from the information storage unit 13 is the same as the second apparatus specific information retrieved from the information storage unit 13. The apparatus specific information collating unit 15 notifies the total control unit 11 of the determination result. Then, according to the determination result of the apparatus specific information collating unit, the total control unit 11 of the mobile terminal 10 performs a process of step S73 in a case where the first apparatus specific information is not the same as the second apparatus specific information while performs a process of step S75 in a case where the first apparatus specific information is the same as the second apparatus specific information.

In step S73, the total control unit 11 of the mobile terminal 10 requests the UI display unit 16 to display the warning screen for indicating the change of the IP address of the user's desired image forming apparatus 20 (expected to perform the printing job).

Figure 7:
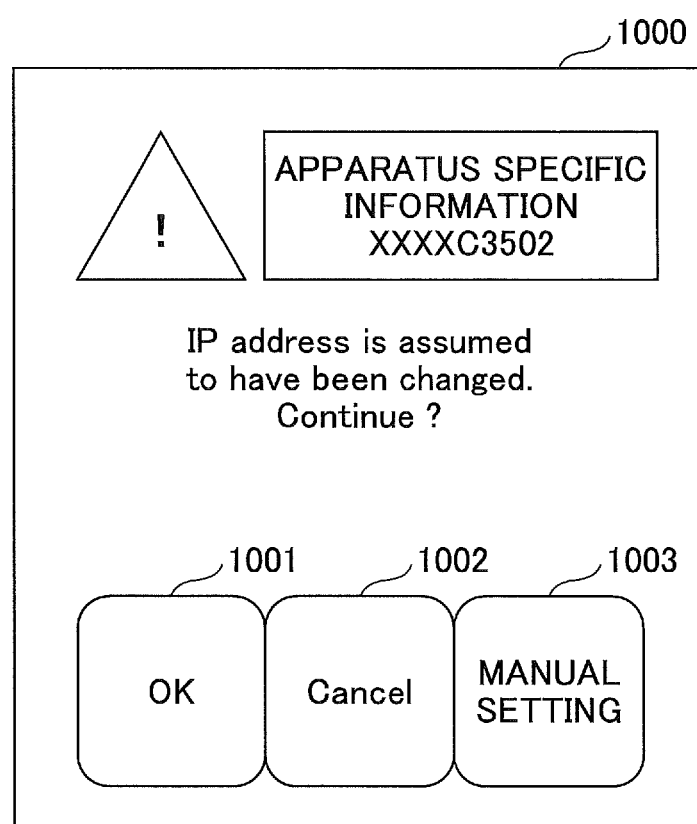
FIG. 7 is a diagram for showing an example of a warning screen.

In step S74, the UI display unit 16 of the mobile terminal 10 generates the warning screen to display it on the display device 102 of the mobile terminal 10. For example, a warning screen 1000 shown in FIG. 7 is displayed. FIG. 7 is a diagram for showing an example of the warning screen.

In the warning screen 1000 shown in FIG. 7, a message indicating that the IP address of the image forming apparatus 20 is assumed to have been changed is displayed with the apparatus specific information of the image forming apparatus 20 desired by the user to perform the printing job. Thus, for example, in a case where the IP address of the image forming apparatus 20 is allocated by using DHCP, the user can be aware of the change of the IP address of the desired image forming apparatus 20. Therefore, sending the printing job to an unintended image forming apparatus 20 to print the printing data by the unintended image forming apparatus 20 is prevented.

In the warning screen 1000 shown in FIG. 7, when the user pushes the OK button 1001, the printing job is performed by the image forming apparatus 20 indicated by the IP address acquired by the information acquiring unit 12 in step S64. Therefore, in this case, the printing job is performed by an image forming apparatus 20 (indicated by the IP address acquired by the information acquiring unit 12) other than the image forming apparatus 20 to which the information medium 30 is attached whereas the user has held the mobile terminal 10 over the information medium 30. Meanwhile, in the warning screen 1000, when the user pushes the cancel button 1002, the printing job is not performed.

Also, for example, in the warning screen 1000 shown in FIG. 7, when the user pushes the manual setting button 1003, the user may input an arbitrary IP address. Thus, in a case where the warning screen 1000 is displayed, the user may input the IP address of the desired image forming apparatus 20 to perform the printing job by the image forming apparatus 20 indicated by the input IP address.

In step S75, the total control unit 11 of the mobile terminal 10 requests the process requesting unit 17 to perform the printing job including the printing data selected in step S61.

In step S76, the process requesting unit 17 of the mobile terminal 10, receiving the request to perform the printing job from the total control unit 11, sends the printing job to the image forming apparatus 20 indicated by the IP address acquired by the information acquiring unit 12 in step S64, and thereby requests to perform the printing job.

In step S77, the print function unit 21 of the image forming apparatus 20, receiving the printing job from the mobile terminal 10, performs the received printing job to print the printing data included in the printing job. Thus, the user can print the desired printing data by the desired image forming apparatus 20.

Second Embodiment

In the following, the printing system 1 of the second embodiment will be described. In the printing system 1 of the second embodiment, in a case where the first apparatus specific information is not the same as the second apparatus specific information, the IP address of the desired image forming apparatus 20 is acquired by sending mail. Therefore, the user can have the desired image forming apparatus 20 perform the printing job even when the IP address of the desired image forming apparatus 20 has been changed. Also, in the printing system 1 of the second embodiment, the mobile terminal 10, receiving the IP address after changing, writes the IP address in the information medium 30 to update the IP address. Additionally, in the following, an identical reference numeral will be applied to elements or the like that have substantially similar functions and configurations to those of in the first embodiment, and descriptions thereof will be omitted.

<Software Configuration>

Figure 8:
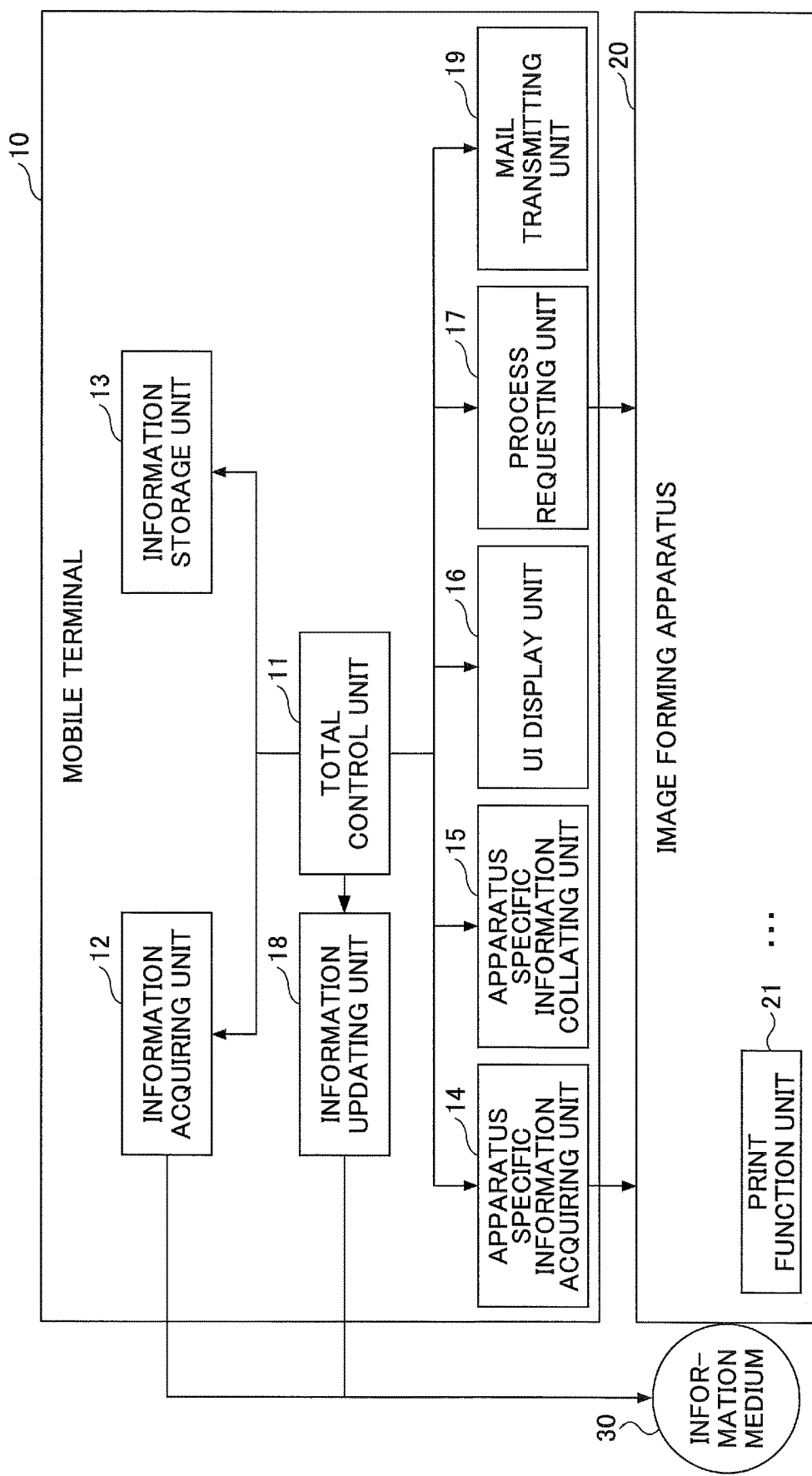
FIG. 8 is a block diagram for illustrating a functional configuration of a printing system of a second embodiment.

For example, the printing system 1 of the present embodiment can be illustrated by a block diagram as shown in FIG. 8. FIG. 8 is a block diagram for illustrating a functional configuration of the printing system 1 of the second embodiment. Additionally, the functional configurations of the image forming apparatus 20 and the information medium 30 are similar to those of the first embodiment. Meanwhile, the mobile terminal 10 of the second embodiment includes an information updating unit 18 and a mail transmitting unit 19 in addition to the functional configuration of the first embodiment.

The information updating unit 18 is achieved by processes of the CPU 106 and the Near Field Communication device 109, and updates the information stored in the information medium 30.

The mail transmitting unit 19 is achieved by processes of the CPU 106 and the communication interface 107, and transmits the mail for acquiring the IP address to the image forming apparatus 20, in accordance with the determination result of the apparatus specific information collating unit 15. Also, the mail transmitting unit 19 receives the mail response from the image forming apparatus 20.

<Details of Process>

Figure 9:
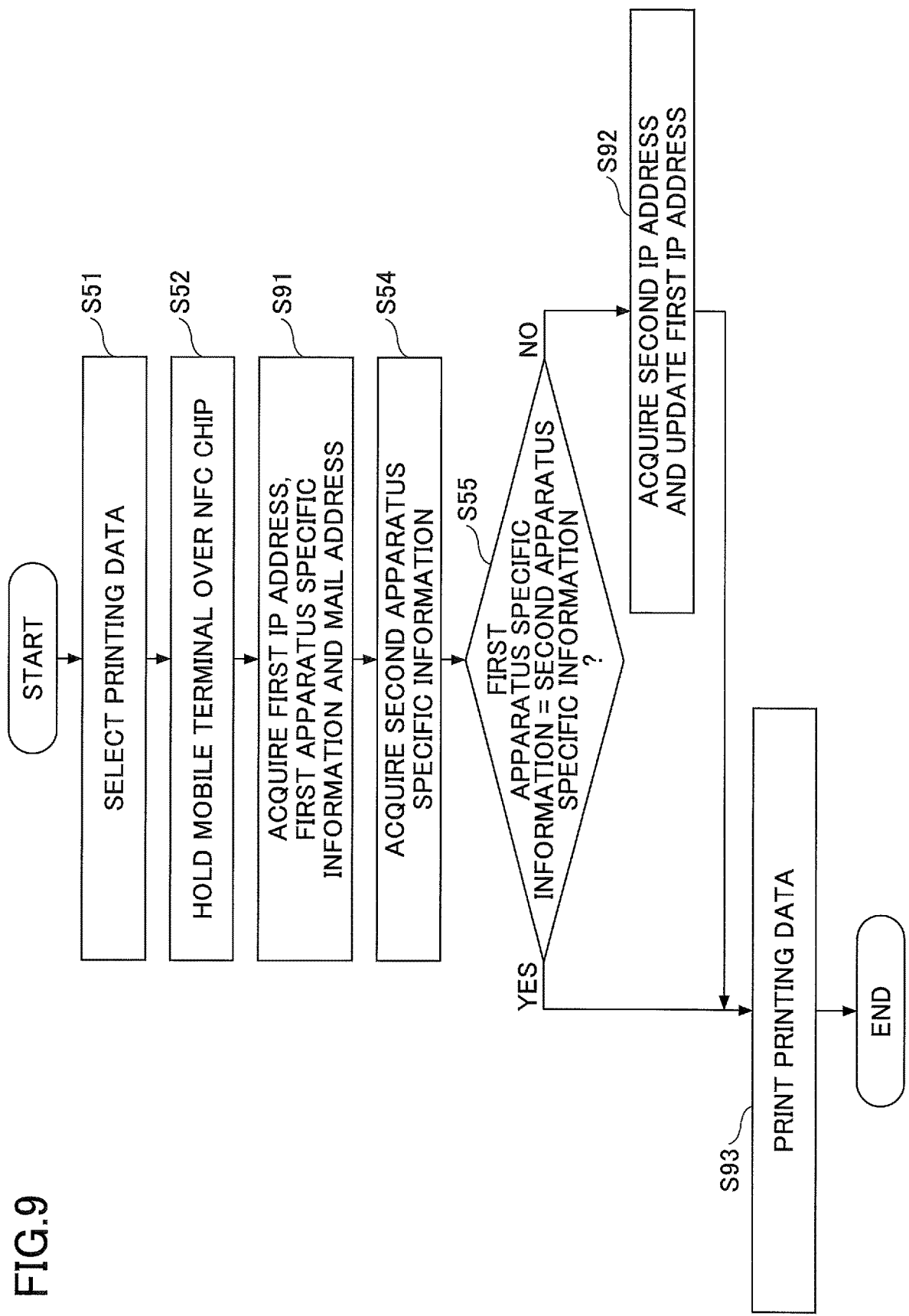
FIG. 9 is a flowchart for illustrating a printing process of the second embodiment.

In the following, details of a process performed by the printing system 1 of the second embodiment will be described. First, flow of the printing process performed by the printing system 1 of the second embodiment is described. FIG. 9 is a flowchart for illustrating the printing process of the second embodiment. In the second embodiment, processes shown as step S91-step S93 are different from the first embodiment. Therefore, only these processes are described while description of other processes is omitted.

In step S91, the information acquiring unit 12 of the mobile terminal 10 acquires, from the information medium 30, the IP address, the apparatus specific information (first apparatus specific information) and a mail address of the image forming apparatus 20 to which the information medium 30 is attached. Additionally, hereinafter, the IP address acquired from the information medium 30 by the information acquiring unit 12 is referred to as "first IP address" so as to distinguish it from the IP address acquired by the mail transmitting unit 19.

In step S92, the mail transmitting unit 19 of the mobile terminal 10 sends a mail message for requesting the IP address setting the mail address acquired in step S91 to be a destination thereof, thereby acquiring the IP address of the desired image forming apparatus 20. Additionally, hereinafter, the IP address acquired by the mail transmitting unit 19 is referred to as "second IP address" so as to distinguish it from the first IP address. The second IP address is an example of third address information.

The information updating unit 18 of the mobile terminal 10 updates (rewrites) the first IP address stored in the information medium 30 with the second IP address. Thus, information of the first IP address becomes identical to information of the second IP address.

In step S93, the process requesting unit 17 of the mobile terminal 10 sends the printing job to one of the image forming apparatuses 20 indicated by the first IP address and the second IP address in accordance with the determination result of the apparatus specific information collating unit 15. The print function unit 21 of the image forming apparatus 20, receiving the printing job from the mobile terminal 10, prints the printing data included in the printing job. As described above, in the second embodiment, even when the IP address of the desired image forming apparatus 20 has been changed, the printing job can be performed by the desired image forming apparatus 20 by sending mail to acquire the IP address after changing.

Figure 10:
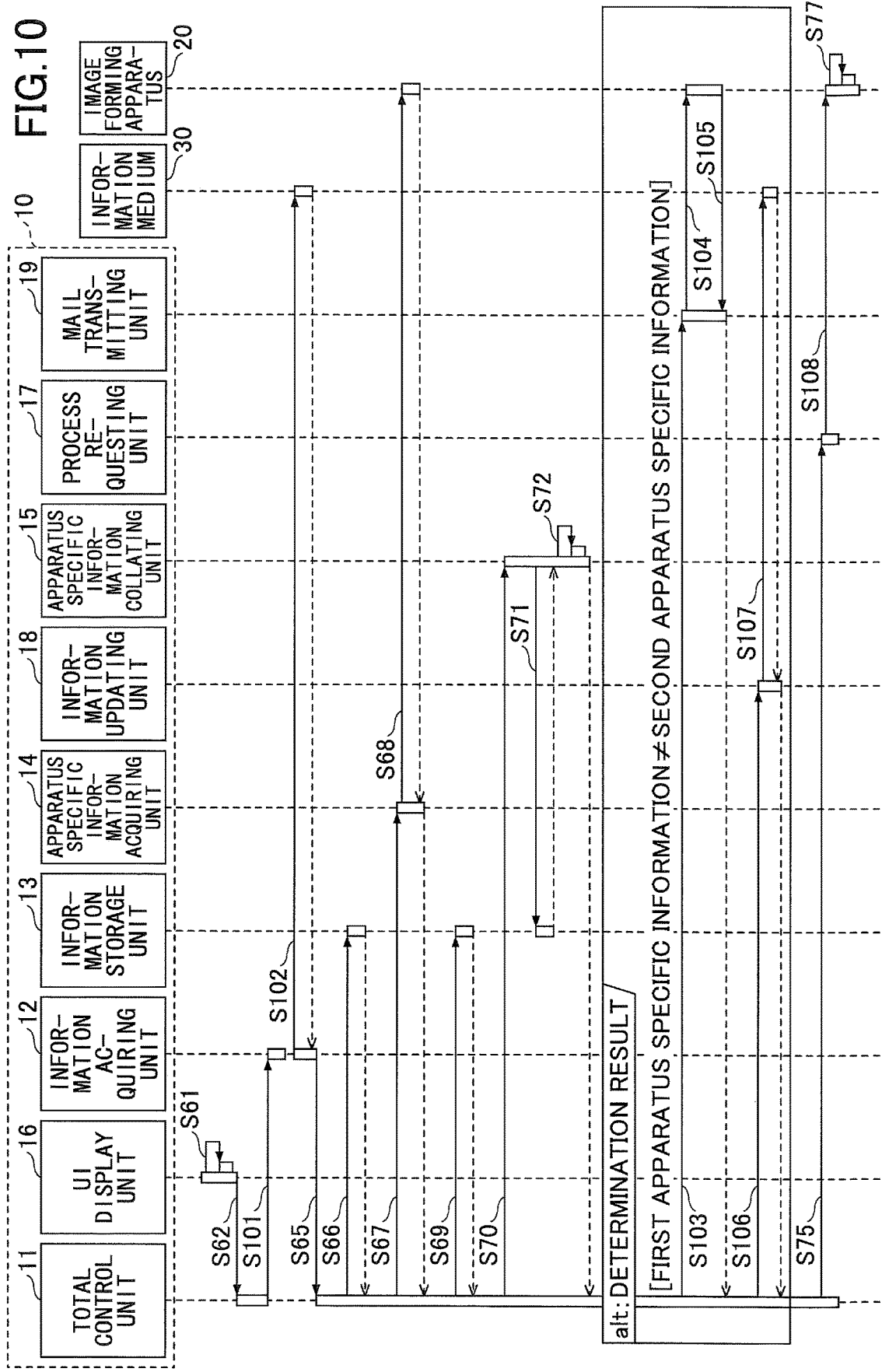
FIG. 10 is a sequence diagram for illustrating an example of a printing process of the second embodiment.

In the following, a detailed description of a sequence of the printing process performed by the printing system 1 of the second embodiment will be given. FIG. 10 is a sequence diagram for illustrating an example of the printing process of the second embodiment. In the second embodiment, processes of step S101-step S108 are different from the first embodiment. Therefore, only these processes are described while description of other processes is omitted.

In step S101, the total control unit 11 of the mobile terminal 10 requests the information acquiring unit 12 to acquire the first IP address, the first apparatus specific information and the mail address through Near Field Communication. Additionally, here, the mail address to be acquired is the mail address of the desired image forming apparatus 20. The mail address is an example of second address information.

Thus, the mobile terminal 10 is ready to communicate with the information medium 30 through Near Field Communication, and the screen displayed in step S62 is maintained until the user holds the mobile terminal 10 over the information medium 30.

Although the description is given where the mail address of the desired image forming apparatus 20 is acquired, this is not a limiting example. For example, in a case where the IP addresses of the image forming apparatuses 20 included in the printing system 1 are allocated by using DHCP, a mail address of a DHCP server may be acquired. In this case, the mail transmitting unit 19 of the mobile terminal 10 can acquire the IP address of the desired image forming apparatus 20 from the DHCP server in step S105 (described below). Thus, only one mail address (mail address of DHCP server) may be stored in the information media 30 attached to the image forming apparatuses 20, which allows reducing labor of an administrator.

In step S102, the user holds the mobile terminal 10 over the NFC chip (information medium 30) attached to the image forming apparatus 20 expected by the user to print the printing data. The information acquiring unit 12 of the mobile terminal 10 acquires the first IP address, the first apparatus specific information from the information medium 30, and the mail address through Near Field Communication. Additionally, for example, at this time, similarly to the first embodiment, the information acquiring unit 12 may acquire information related to SSID (Service Set Identifier) or encryption schemes, password for using the network, port number of HTTP (HyperText Transfer Protocol) or HTTPS (HTTP over SSL/TLS) for using functions provided by the image forming apparatus 20. Also, similarly to the first embodiment, for example, the user may acquire the IP address, the first apparatus specific information and the like from the information medium 30, by reading a QR code attached, as the information medium 30, outside the image forming apparatus 20 using a camera device (not shown) included in the mobile terminal 10.

In step S103, the total control unit 11 of the mobile terminal 10 requests the mail transmitting unit 19 to send the mail in a case where the apparatus specific information collating unit 15 determines that the first apparatus specific information is not the same as the second apparatus specific information.

In step S104, the mail transmitting unit 19 of the mobile terminal 10 sends the mail for requesting the IP address (second IP address), setting the mail address acquired by the information acquiring unit 12 in step S102 to be a destination thereof. Additionally, the mail for requesting the second IP address may be directly sent by the mail transmitting unit 19, or electronic mail software installed in the mobile terminal 10 may send the mail, where, for example, the process is coordinated with the electronic mail software. Also, the mail transmitting unit 19 may only display the mail address on the display device 102 of the mobile terminal 10 so as to prompt the user to send the mail, setting the displayed mail address to be a destination thereof.

In step S105, the image forming apparatus 20, in response to the mail for requesting the IP address from the mobile terminal 10, sends the mail to the mobile terminal 10, describing own IP address (second IP address) in it. The mail transmitting unit 19 of the mobile terminal 10, accepting the mail responded from the image forming apparatus 20, notifies the total control unit 11 of the acquisition of the second IP address.

Additionally, for example, in a case where the electronic mail software installed in the mobile terminal 10 receives the response mail, the second IP address may be sent from the electronic mail software to the mail transmitting unit 19, having the mail transmitting unit 19 be coordinated with the electronic mail software. Also, the second IP address may be sent to the mail transmitting unit 19 when the user opens the response mail to click (select) a certain link or the like described in the mail.

Meanwhile, in a case where the mail transmitting unit 19 receives the response mail, the second IP address described in the response mail may be automatically acquired. In this case, for example, the image forming apparatus 20 sends a SMS (Short Message Service) message in which the second IP address is described to the mobile terminal 10. That is, in step S104, the mail transmitting unit 19 acquires a telephone number of the mobile terminal 10 and sends a mail message in which the acquired telephone number is described to the image forming apparatus 20. Then, the image forming apparatus 20 sends a SMS message in which the second IP address is described, setting the telephone number to be a destination thereof.

In step S106, the total control unit 11 of the mobile terminal 10 requests the information updating unit 18 to update the first IP address stored in the information medium 30.

In step S107, the information updating unit 18 of the mobile terminal 10, accepting the request to update the first IP address stored in the information medium 30 from the total control unit 11, updates the first IP address stored in the information medium 30 with the second IP address acquired in step S105. Thus, the first IP address stored in the information medium 30 is updated with the IP address allocated to the user's desired image forming apparatus 20. Then, the information updating unit 18 of the mobile terminal 10 notifies the total control unit 11 of the completion of the update of the information medium 30 when the update of the information medium 30 is completed.

Additionally, the information updating unit 18 of the mobile terminal 10, in response to the request for update of the information medium 30 from the total control unit 11, may display a screen on the display device 102 for prompting the user to hold the mobile terminal 10 over the information medium 30 to be updated. Then, the first IP address stored in the information medium 30 may be updated with the second IP address through Near Field Communication when the user holds the mobile terminal 10 over the information medium 30.

Additionally, for example, updating the IP address stored in the information medium 30 may be permitted only by a user who has an administrator authority of the printing system 1.

In step S108, the process requesting unit 17 of the mobile terminal 10, receiving the request to perform the printing job from the total control unit 11, sends the printing job to the image forming apparatus 20 indicated by the first IP address acquired by the information acquiring unit 12 in step S64 or indicated by the second IP address acquired by the mail transmitting unit 19 in step S105, and thereby requests to perform the printing job. That is, in a case where the apparatus specific information collating unit 15 determines that the first apparatus specific information is the same as the second apparatus specific information, the process requesting unit 17 sends the printing job to the image forming apparatus 20 indicated by the first IP address. Meanwhile, in a case where the apparatus specific information collating unit 15 determines that the first apparatus specific information is not the same as the second apparatus specific information, the process requesting unit 17 sends the printing job to the image forming apparatus 20 indicated by the second IP address. Thus, the printing job is performed by the user's desired image forming apparatus 20 even if the IP address of the user's desired image forming apparatus 20 has been changed.

Third Embodiment

In the following, the printing system 1 of a third embodiment will be described. In the image forming apparatus 20 of the third embodiment, an operation panel and a main part separately control power supply. Additionally, in the following, an identical reference numeral will be applied to elements or the like that have substantially similar functions and configurations to those of in the second embodiment, and descriptions thereof will be omitted.

<Hardware Configuration>

Figure 11:
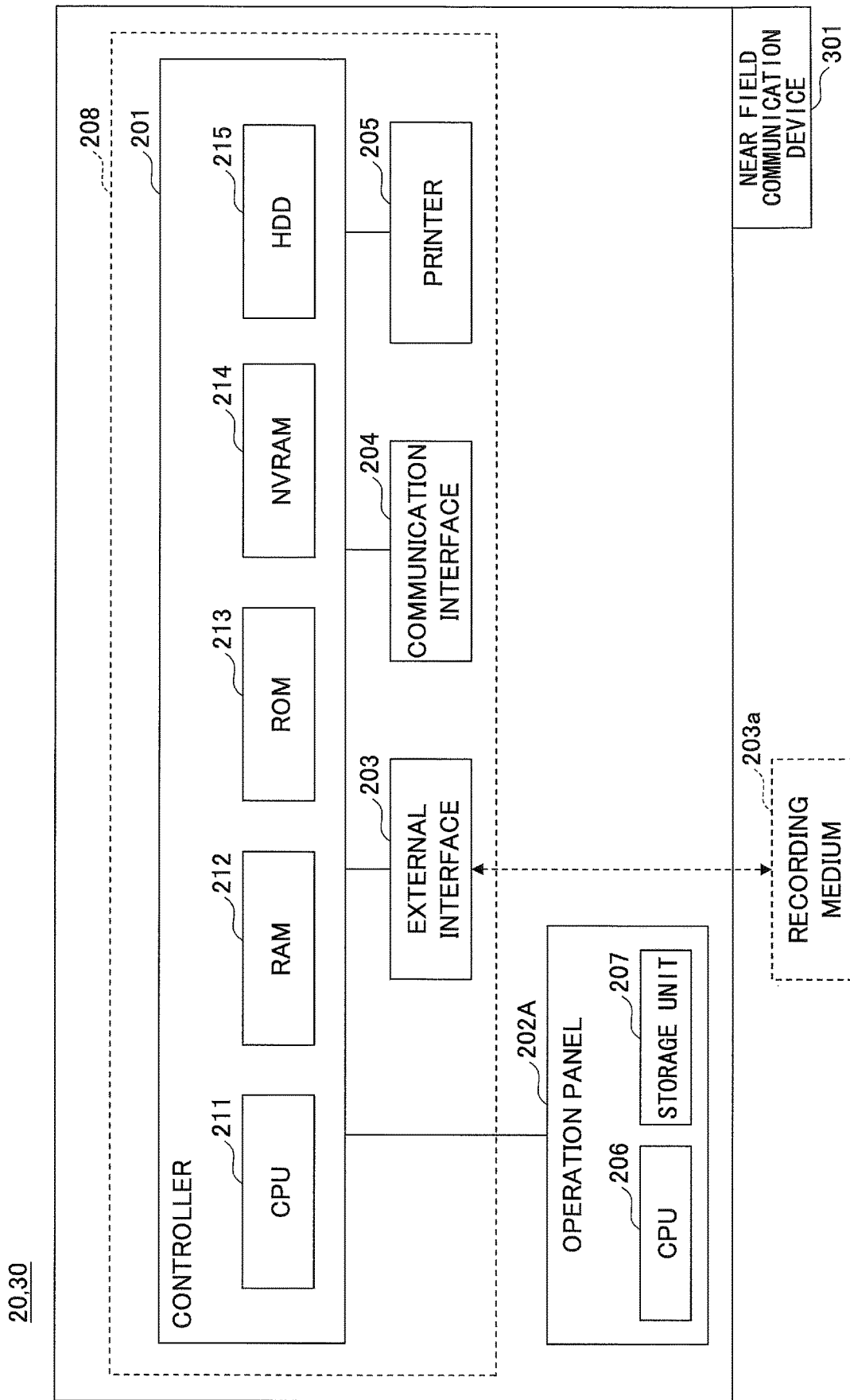
FIG. 11 is a block diagram for illustrating an example of a hardware configuration of an image forming apparatus and an information medium of a third embodiment.

For example, the image forming apparatus 20 of the third embodiment has a hardware configuration as shown in FIG. 11. FIG. 11 is a block diagram for illustrating an example of the hardware configuration of the image forming apparatus 20 and the information medium 30 of the third embodiment. The image forming apparatus 20 includes an operation panel 202A, including a CPU 206 and a storage unit 207, which is different from the second embodiment. For example, the storage unit 207 is formed of RAM or ROM.

In the third embodiment, the controller 201, the external interface 203, the communication interface 204 and the printer 205 are referred to as a main part 208, for convenience of explanation. That is, the image forming apparatus 20 includes the operation panel 202A as a user interface and the main part 208 for performing processes related to image forming.

<Software Configuration>

Figure 12:
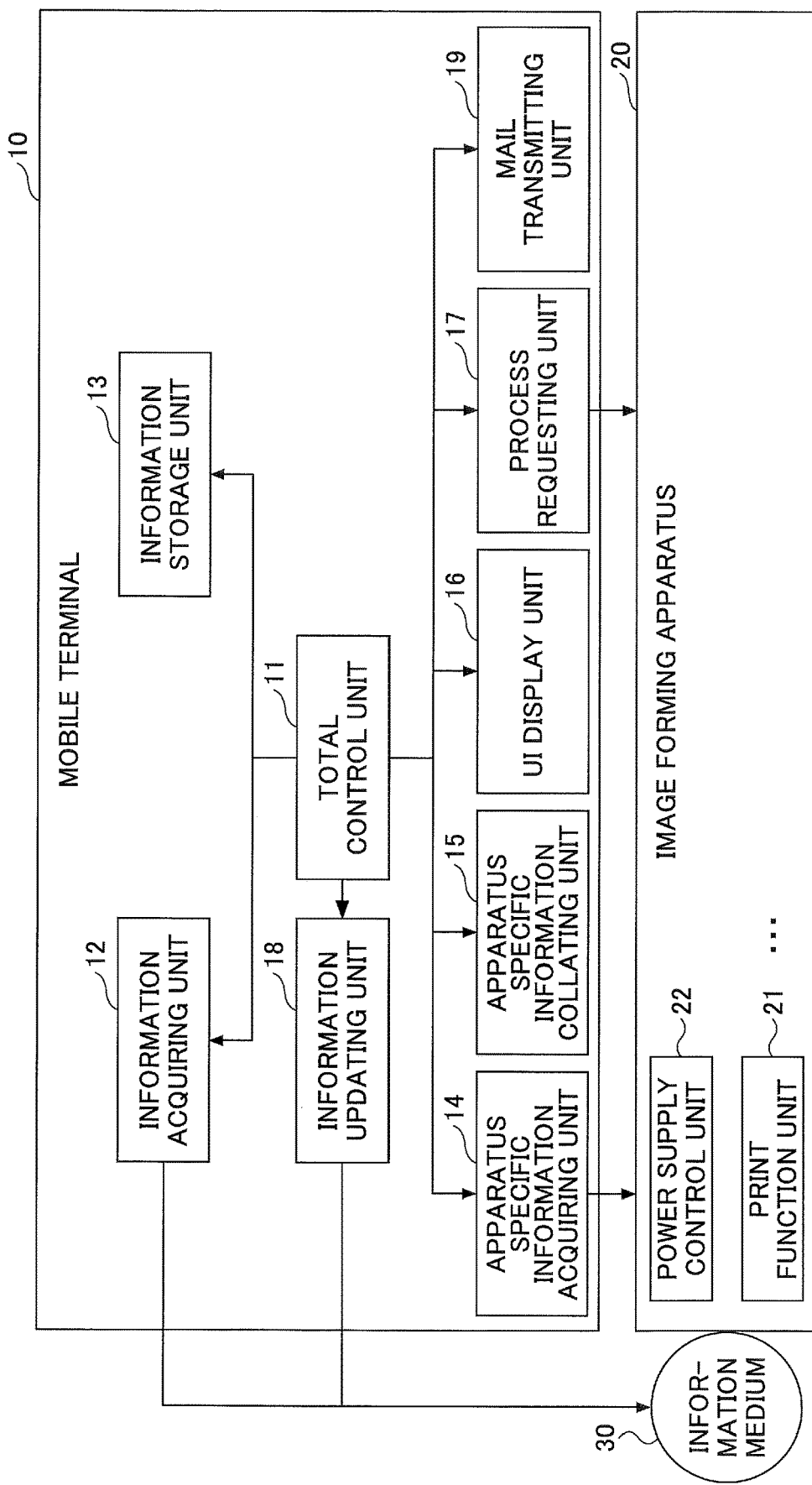
FIG. 12 is a block diagram for illustrating an example of a functional configuration of a printing system of the third embodiment.

For example, the printing system 1 of the third embodiment has a functional configuration as shown in FIG. 12. FIG. 12 is a block diagram for illustrating an example of the functional configuration of the printing system 1 of the third embodiment.

The image forming apparatus 20 of the third embodiment includes a power supply control unit 22, which is different from the second embodiment.

The power supply control unit 22 is achieved by processes of the CPU 211 and the CPU 206 and the like, and controls a power supply state of the operation panel 202A and the main part 208. Here, the power supply states of the operation panel 202A and the main part 208 are described with reference to FIG. 13. FIG. 13 is diagram for illustrating an example of the power supply states of the operational panel and the main part.

As shown in FIG. 13, the power supply states of the operation panel 202A include a state of "Power On" indicating that electric power is supplied to the operation panel 202A and a state of "Power Off" indicating that the electric power is not supplied to the operation panel 202A. Meanwhile, the power supply states of the main part 208 include a state of "Standby" indicating that the electric power is supplied to the entire main part 208 and a state of "Engine Off" indicating that the electric power is supplied to units included in the main part 208 except an image forming engine formed by units included in the main part 208 such as printer 205. Also, the power supply state of the main part 208 includes a state of "STR (Suspend To RAM)" indicating that the electric power is not supplied to units included in the main part 208 except the RAM 212 and the like.

As shown in FIG. 13, in a case where the power supply state of the operation panel 202A is "Power On", the power supply state of the main part 208 becomes any one of "Standby", "Engine Off", or "STR". Similarly, in a case where the power supply state of the operation panel 202A is "power off", the power supply state of the main part 208 becomes any one of "Standby", "Engine Off" or "STR".

As described above, the power supply control unit 22 of the image forming apparatus 20 of the present embodiment can separately control the power supply states of the operation panel 202A and the main part 208. Thus, according to the printing system 1 of the present embodiment, power consumption in the image forming apparatus 20 can be reduced while waiting time of a user in the printing process can be reduced.

That is, as described in the first embodiment and the second embodiment, the printing process of the image forming apparatus 20 is performed through user's operation in the mobile terminal 10. Therefore, power (energy) consumption in the image forming apparatus 20 can be reduced by setting the power supply state of the operation panel 202A to be "Power Off" while setting the power supply state of the main part 208 to be "Standby" or "Engine Off". In other words, in a case where the mobile terminal 10 is used as a user interface of the image forming apparatus 20, electric power is supplied to the main part 208 and is stopped being supplied to the operation panel 202A, thereby reducing the power consumption.

Further, in the image forming apparatus 20 of the present embodiment, as described above, the power supply state of the main part 208 may be "Standby" or "Engine Off" when the power supply state of the operation panel 202A is set to be "Power Off". Therefore, the user's waiting time in the printing process can be reduced in comparison with a case where the electric power is totally stopped being supplied to the image forming apparatus 20 (that is, delay time for supplying electric power to the main part 208 can be reduced).

For example, in a case where the user operates the operation panel 202A to perform the printing process, the power supply control unit 22 may set the power supply state of the main part 208 to be "STR" when a predetermined period passes without accepting any operations on the operation panel 202A. That is, in a case where a predetermined period passes from timing at which the last operation is input on the operation panel 202A, the power supply control unit 22 may set the power supply state of the main part 208 to be "STR" while keeping the power supply state of the operation panel 202A to be "Power On".

Thus, the power consumption in the image forming apparatus 20 can be reduced. Further, the user's waiting time in the printing process can be also reduced since the power supply state of the operation panel 202A remains to be "Power On". Additionally, in a case where the power supply state of the main part 208 is "STR" and any operation is input to the operation panel 202A, the power supply control unit 22 may set the power supply state of the main part 208 to be "Standby".

Also, for example, the power supply control unit 22 may control the power supply state of the main part 208 and the operation panel 202A in coordination with operational mode of the image forming apparatus 20. Here, for example, the operational mode includes a mode for requesting to perform the printing job based on the IP address acquired by the mobile terminal 10 from the information medium 30 as described in the first embodiment and the second embodiment. Also, for example, the operational mode further includes a mode where a login operation is required to request for performing the printing job and a mode where the login operation is not required to request for performing the printing job.

In this case, for example, the power supply control unit 22 sets the power supply state of the main part 208 to be "STR" and the power supply state of the operation panel 202A to be "Power On" in a case where the operational mode is set to be the mode for requesting to perform the printing job based on the IP address acquired by the mobile terminal 10 and the login operation is required to request for performing the printing job.

Also, for example, the power supply control unit 22 sets the power supply state of the main part 208 to be "Standby" and the power supply state of the operation panel 202A to be "Power Off" in a case where the operational mode is set to be the mode for requesting to perform the printing job based on the IP address acquired by the mobile terminal 10, and the login operation is not required to request for performing the printing job.

Further, for example, the power supply control unit 22 sets the power supply state of the main part 208 to be "STR" and the power supply state of the operation panel 202A to be "Power On" in a case where the operational mode is set to be the mode for requesting to perform the printing job without acquiring the IP address and the login operation is required to request for performing the printing job.

Also, for example, the power supply control unit 22 sets the power supply state of the main part 208 to be "STR" and the power supply state of the operation panel 202A to be "Power Off" in a case where the operational mode is set to be the mode for requesting to perform the printing job without acquiring the IP address and the login operation is not required to request for performing the printing job.

SUMMARY

As described above, in the printing system 1 of the first embodiment, whether the first apparatus specific information acquired from the information medium 30 is the same as the second apparatus specific information acquired based on the IP address acquired from the information medium 30 is determined. In a case where the first apparatus specific information is determined to not be the same as the second apparatus specific information, the printing job is not performed since the IP address of the image forming apparatus 20 which is expected by the user to perform the printing job is assumed to have been changed. Thus, performing the printing job by an unintended image forming apparatus 20 can be prevented.

In the printing system 1 of the second embodiment, in a case where the first apparatus specific information is determined to not be the same as the second apparatus specific information, the mail message is sent, setting a certain mail address to be a destination thereof so as to acquire the IP address of the image forming apparatus 20 which is expected by the user to perform the printing job. Thus, the user can instruct the desired image forming apparatus 20 to perform the printing job even when the IP address of the image forming apparatus 20 has been changed.

Further, in the printing system 1 of the third embodiment, the operation panel 202A and the main part 208 included in the image forming apparatus 20 separately control power supply. Therefore, power consumption in the image forming apparatus 20 can be reduced while the user's waiting time in the printing process can be reduced.

Additionally, the information acquiring unit 12 is an example of a first acquiring unit. The apparatus specific information acquiring unit 14 is an example of a second acquiring unit. The apparatus specific information collating unit 15 is an example of a determining unit. The process requesting unit 17 is an example of a process requesting unit. The UI display unit 16 is an example of a display unit. The mail transmitting unit 19 is an example of a third acquiring unit. The information updating unit 18 is an example of an updating unit.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium having stored therein a program for causing a user device to serve as an information processing apparatus connected with one or more devices through a network for printing a print job, the information processing apparatus comprising:
   a processor; and
   a memory storing instructions to be executed by the processor, the execution of the instructions causing the processor to:
      acquire a first Internet Protocol (IP) address and a first identifier that identifies an image forming apparatus via a Near Field Communication (NFC) device attached to the image forming apparatus that stores the first IP address and the first identifier;
      acquire, from at least one device, a second identifier that identifies the at least one device via the network using the first IP address;
      determine whether a match exists between the first identifier acquired via the NFC device attached to the image forming apparatus and the second identifier acquired via the network by using the first IP address;
      in response to determining that the first identifier and the second identifier match, request the at least one device to print the print job by transmitting the request via the first IP address, wherein the first identifier is acquired via the NFC device attached to the image forming apparatus, an wherein the second identifier is acquired via the network using the first IP address; and
      in response to not determining the first identifier and the second identifier match, generate a message for display indicating that the first IP address of the image forming apparatus in the network has been changed.

2. The non-transitory computer-readable recording medium as claimed in claim 1, the information processing apparatus further comprising:
   a display unit configured to display the message indicating that the first IP address of the image forming apparatus in the network has been changed,
   wherein, in response to determining that the first identifier and the second identifier are not the same, the execution of the instructions further causes the processor to acquire a second IP address for the at least one device by issuing a request to the at least one device to send an electronic message that includes a second IP address that belongs to the at least one device, and to request the at least one device to print the print job by transmitting the request via the second IP address.

3. The non-transitory computer-readable recording medium as claimed in claim 2, wherein the first identifier and the second identifier each include one of a Media Access Control (MAC) address and a serial number, and the electronic message sent by the at least one device includes one of an e-mail message and a Short Message Service (SMS) message.

4. The non-transitory computer-readable recording medium as claimed in claim 2, wherein the execution of the instructions further causes the processor to update the first IP address stored in the NFC device attached to the image forming apparatus with the second IP address.

5. The non-transitory computer-readable recording medium as claimed in claim 2, wherein IP addresses of the one or more devices of the network are allocated using Dynamic Host Configuration Protocol (DHCP), the first identifier includes an electronic mail address, and the processor is configured to acquire the second IP address of the at least one device by issuing a request to a DHCP server via the electronic mail address.

6. The non-transitory computer-readable recording medium as claimed in claim 1, wherein the user device is a smart phone, and the first IP address and the first identifier are acquired by reading a QR code through a camera of the smart phone.

7. The non-transitory computer-readable recording medium as claimed in claim 1, wherein the execution of the instructions further causes the processor to acquire the second identifier from MIB (Management Information Base) of the at least one device indicated by the first IP address.

8. The non-transitory computer-readable recording medium as claimed in claim 2, wherein the execution of the instructions further causes the processor to acquire the second identifier through WebAPI provided by the at least one device indicated by the first IP address.

9. An information processing apparatus connected with one or more devices through a network for printing a print job, comprising:
   a processor configured to:
      acquire a first Internet Protocol (IP) address and a first identifier that identifies an image forming apparatus via a Near Field Communication (NFC) device attached to the image forming apparatus that stores the first IP address and the first identifier;

acquire, from at least one device, a second identifier that identifies the at least one device via the network using the first IP address;

determine whether a match exists between the first identifier acquired via the NFC device attached to the image forming apparatus and the second identifier acquired via the network by using the first IP address;

in response to that the first identifier and the second identifier match, request the at least one device to print the print job by transmitting the request via the first IP address, wherein the first identifier is acquired via the NFC device attached to the image forming apparatus, and wherein the second identifier is acquired via the network using the first IP address; and in response to not determining the first identifier and the second identifier match, generate a message for display indicating that the first IP address of the image forming apparatus in the network has been changed.

10. An information processing method of an information processing apparatus connected with one or more devices through a network, the information processing method comprising:

acquiring a first Internet Protocol (IP) address and a first identifier that identifies an image forming apparatus via a Near Field Communication (NFC) device attached to the image forming apparatus that stores the first IP address and the first identifier;

acquiring, from at least one device a second identifier that identifies the at least one device via the network using the first IP address;

determining whether a match exists between the first identifier acquired via the NFC device attached to the image forming apparatus and the second identifier acquired via the network by using the first IP address;

in response to determining that the first identifier and the second identifier match, requesting the at least one device to print a print job by transmitting the request via the first IP address wherein the first identifier is acquired via the NFC device attached to the image forming apparatus, and wherein the second identifier is acquired via the network using the first IP address; and in response to not determining the first identifier and the second identifier match, generating a message for display indicating that the first IP address of the image forming apparatus in the network has been changed.

* * * * *